United States Patent
Shaw

(10) Patent No.: US 10,123,191 B2
(45) Date of Patent: Nov. 6, 2018

(54) DEVICE OPERATIONAL PROFILES

(71) Applicant: AT&T Intellectual Property I, L.P., Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 197 days.

(21) Appl. No.: 14/529,202

(22) Filed: Oct. 31, 2014

(65) Prior Publication Data

US 2016/0127172 A1 May 5, 2016

(51) Int. Cl.
  *H04W 4/80* (2018.01)
  *H04L 12/24* (2006.01)
  *H04W 4/38* (2018.01)

(52) U.S. Cl.
  CPC .......... *H04W 4/80* (2018.02); *H04L 41/0806* (2013.01); *H04W 4/38* (2018.02); *H04L 41/082* (2013.01)

(58) Field of Classification Search
  None
  See application file for complete search history.

(56) References Cited

U.S. PATENT DOCUMENTS

| | | |
|---|---|---|
| 6,799,155 B1 | 9/2004 | Lindemann et al. |
| 6,873,609 B1 | 3/2005 | Jones et al. |
| 7,162,408 B2 | 1/2007 | Kashyap et al. |
| 7,565,137 B2 | 7/2009 | Shaw et al. |
| 7,580,699 B1 | 8/2009 | Shaw et al. |
| 7,734,289 B2 | 6/2010 | Shaw et al. |
| 7,802,292 B2 | 9/2010 | Shaw |
| 8,359,008 B2 | 1/2013 | Zhou et al. |

(Continued)

FOREIGN PATENT DOCUMENTS

| | | |
|---|---|---|
| CN | 101222712 | 9/2010 |
| CN | 101977409 | 2/2011 |

(Continued)

OTHER PUBLICATIONS

Yoo et al., "Design of USIM Secure Applet for the secure execution of APK," $3^{rd}$ International Conference on Computer Science and Information Technology, Jan. 4-5, 2013, pp. 14-17, Bali, Indonesia.

(Continued)

*Primary Examiner* — Thomas J Dailey
(74) *Attorney, Agent, or Firm* — Hartman & Citrin LLC

(57) ABSTRACT

Concepts and technologies are disclosed herein for device operational profiles. According to one aspect disclosed herein, a profile orchestration system can receive information from a user device. The information can identify a service to be provided by the user device using, at least in part, sensor data received from one or more sensor devices. The profile orchestration system can determine a device operational profile that is suitable for generating one or more settings that are useable by the sensor device(s) to collect the sensor data. The profile orchestration system can send the device operational profile to a profile provisioning system. The profile provisioning system can utilize the device operational profile to provision the sensor device(s) with the setting(s). The sensor device(s) can utilize the setting(s) to perform one or more operations in support of the user device providing the service.

18 Claims, 7 Drawing Sheets

(56) References Cited

U.S. PATENT DOCUMENTS

| | | | |
|---|---|---|---|
| 8,532,706 | B2 | 9/2013 | Kaul |
| 8,707,022 | B2 | 4/2014 | Haggerty et al. |
| 8,738,729 | B2 | 5/2014 | Haggerty et al. |
| 8,738,815 | B2 | 5/2014 | Lee |
| 8,788,832 | B2 | 7/2014 | Guccione et al. |
| 8,811,969 | B2 | 8/2014 | Shi et al. |
| 9,332,392 | B1* | 5/2016 | Conway ............... H04W 4/025 |
| 2007/0130465 | A1 | 6/2007 | Zeng et al. |
| 2007/0288650 | A1* | 12/2007 | Marshall ............... G01W 1/00 709/231 |
| 2008/0020755 | A1 | 1/2008 | Liu et al. |
| 2009/0171180 | A1* | 7/2009 | Pering ............... A61B 5/0002 600/372 |
| 2010/0255830 | A1* | 10/2010 | Manolescu ............ H04L 67/12 455/418 |
| 2012/0017076 | A1* | 1/2012 | Peng ............... G06F 9/4406 713/100 |
| 2012/0221673 | A1 | 8/2012 | Lee et al. |
| 2012/0239335 | A1* | 9/2012 | Lachapelle ......... G05B 19/042 702/98 |
| 2013/0023235 | A1 | 1/2013 | Fan et al. |
| 2013/0079059 | A1 | 3/2013 | Huslak |
| 2013/0223279 | A1* | 8/2013 | Tinnakornsrisuphap ............ H04L 41/0809 370/254 |
| 2013/0225146 | A1 | 8/2013 | Qi et al. |
| 2014/0094148 | A1 | 4/2014 | Lang et al. |
| 2014/0141746 | A1 | 5/2014 | Tan et al. |
| 2015/0038130 | A1* | 2/2015 | Mao ............... G06F 9/44505 455/418 |
| 2015/0046828 | A1* | 2/2015 | Desai ............... G06F 1/163 715/739 |
| 2015/0163210 | A1* | 6/2015 | Meyers ............... H04W 4/70 726/4 |
| 2015/0195286 | A1* | 7/2015 | Doppler ............... H04L 67/125 726/4 |
| 2017/0046173 | A1* | 2/2017 | Moraes ............... G06F 13/385 |

FOREIGN PATENT DOCUMENTS

| | | |
|---|---|---|
| JP | 2013061956 | 4/2013 |
| WO | WO 2004021715 | 3/2004 |
| WO | WO 2006094564 | 9/2006 |
| WO | WO 2008040964 | 4/2008 |
| WO | WO 2013097177 | 7/2013 |
| WO | WO 2013120883 | 8/2013 |
| WO | WO 2014005324 | 1/2014 |
| WO | WO 2014101094 | 7/2014 |

OTHER PUBLICATIONS

So-In et al., "Virtualization architecture using the ID/Locator split concept for Future Wireless Networks (FWNs)," Computer Networks 55 (2011), Sep. 22, 2010, pp. 415-430.

Lange et al., "L4Android: A Generic Operating System Framework for Secure Smartphones," SPSM' 11, Oct. 17, 2011, ACM, Chicago, IL.

Hung et al., "Virtualizing Smartphone Applications to the Cloud," Computing and Informatics, vol. 30, 2011, pp. 1083-1097.

Gaber et al., "Security and trust for mobile phones based on virtualization," Norwegian Information Security Conference, Nov. 23-24, 2010, pp. 93-103, NISK.

* cited by examiner

DEVICE OPERATIONAL PROFILES

BACKGROUND

Mobile device management ("MDM") is a set of technologies, protocols, and standards used for the remote management of mobile devices operating in a mobile telecommunications network. MDM provides various services for a mobile telecommunications service provider. One such service, called firmware over-the-air ("FOTA"), allows a mobile telecommunication service provider to send firmware updates to remote mobile devices. The use of MDM to facilitate FOTA updates has greatly improved the delivery of firmware updates to mobile devices operating in a mobile communications service provider's network.

Prior to FOTA, firmware updates required a user to visit a service center to have their mobile device updated with the latest firmware, or to connect their mobile device to a computer through a universal serial bus ("USB") or other connection to update their device with the latest firmware. These methods are inconvenient for the user and rely heavily on users to seek out the firmware update. Some solutions exist to notify the user, via email, short message service ("SMS") message, or other message, to connect their mobile device to their computer to receive the firmware update. These notifications are often ignored because, for many, updating their firmware is a difficult, time-consuming process.

Firmware updates often provide new features, while others are aimed at fixing bugs, improving various performance aspects of the mobile device, or even enabling functionality that is supported by the hardware of the mobile device, but has not yet been enabled. The latter is particularly relevant to devices that ship with hardware that is compatible with a next generation wireless network, but does not include the proper firmware to enable that hardware.

FOTA allows users to download firmware over-the-air directly to their mobile device. The mobile telecommunication service provider delivering the firmware does not know if the user associated with a particular destination mobile device is available to download and install the firmware. As such, firmware updates can be denied by a user. In some implementations, a user may deny a firmware update a predetermined number of times, after which the firmware update is forced. This may inconvenience the user by repeatedly asking the user to download the firmware, particularly if they need to use their mobile device at the time the firmware update is forced.

Smart card devices such as universal integrated circuit cards ("UICCs") with one or more subscriber identity module ("SIM") applications installed thereon (commonly referred to as "SIM cards") are typically inserted into a designated slot in a mobile device such as a smartphone or tablet computing device. A SIM card stores information according to one or more telecommunications standards to allow a device to authenticate and identify users on a network. SIM cards commonly store information such as a unique serial number called an integrated circuit card identification ("ICCID"), a unique number to identify a subscriber called an international mobile subscriber identity ("IMSI"), an authentication key ("Ki") to authenticate the SIM to one or more networks, the current location area identity ("LAI") that identifies a location area in which the mobile device is currently located, an operator-specific emergency number, and other information. As manufacturing technologies advance to enable nano-manufacturing and pico-manufacturing processes, devices will likely become increasingly smaller, making such SIM slot or similar interfaces smaller or even obsolete.

SUMMARY

Concepts and technologies are disclosed herein for device operational profiles. According to one aspect disclosed herein, a profile orchestration system can receive information from a user device. The information can identify a service to be provided by the user device using, at least in part, sensor data received from one or more sensor devices. The profile orchestration system can determine a device operational profile that is suitable for generating one or more settings that are useable by the sensor device(s) to collect the sensor data. The profile orchestration system can send the device operational profile to a profile provisioning system. The profile provisioning system can utilize the device operational profile to provision the sensor device(s) with the setting(s). The sensor device(s) can utilize the setting(s) to perform one or more operations in support of the user device providing the service.

In some embodiments, the information further identifies a location of the user device. In some embodiments, the information further identifies an application that uses the sensor data, at least in part, to provide the service. In some embodiments, the information further identifies a user preference. In some embodiments, the information further identifies a capability of the user device. In some embodiments, the information further identifies some combination of the above.

In some embodiments, the profile orchestration system can generate a lookup query that includes the information. The profile orchestration system can send the lookup query to a device operational profile database. The device operational profile database can perform a lookup operation to determine whether one or more device operational profiles exist that can utilize the information. If such a device operational profile exists, then the device operational profile database can send the device operational profile to the profile orchestration system. The profile orchestration system can receive the device operational profile from the device operational profile database. In some other embodiments, the profile orchestration system can create a new device operational profile based, at least in part, upon the information. In some other embodiments, the profile orchestration system can modify an existing device operational profile based, at least in part, upon the information.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
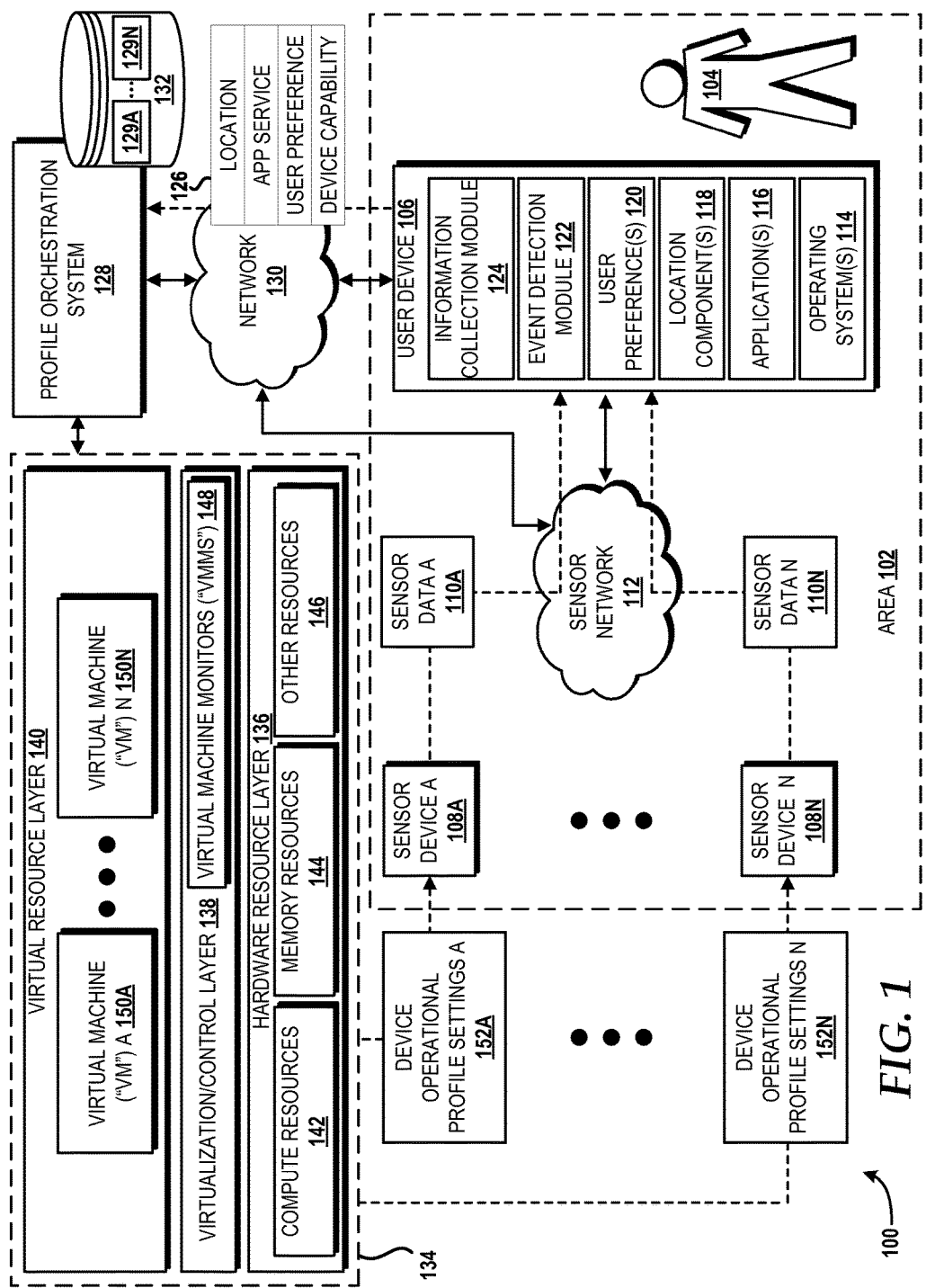
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of device operational profiles will be presented.

Turning now to FIG. 1, a block diagram illustrating aspects of an illustrative operating environment 100 for implementing the various concepts and technologies disclosed herein will be described. The operating environment 100 shown in FIG. 1 includes an area 102 in which a user 104 and his or her user device 106 are located. The area 102 can be an indoor area or an outdoor area. An indoor area might be a building, a temporary structure such as a tent, or an area within a building or temporary structure. An outdoor area might be a park, a parking lot, or any other outdoor area. It should be understood that the area 102 can have any dimensions. It also should be understood that the area 102 is not restricted to areas that may be purely defined as indoor or outdoor but instead the area 102 can be a combination of indoor and outdoor areas.

The area 102 includes one or more sensor devices 108A-108N (hereinafter collectively referred to as "sensor devices 108") that can monitor one or more conditions of the area 102, one or more conditions of the user 104, and/or one or more conditions of the user device 106. The sensor devices 108A-108N can collect sensor data 110A-110N, respectively (hereinafter collectively referred to as "sensor data 110"). The sensor data 110 can be utilized by the user device 106 to provide one or more services to the user 104 as will be described in greater detail below.

Each of the sensor devices 108 can be or can include one or more sensors, some examples of which include, but are not limited to, automotive sensors, chemical sensors, gas sensors, electric current sensors, electric potential sensors, magnetic sensors, radio sensors, environment sensors, weather sensors, moisture sensors, humidity sensors, flow sensors, fluid velocity sensors, radiation sensors, atomic and subatomic particular sensors, navigation sensors, position sensors, angle sensors, gyroscope sensors, displacement sensors, distance sensors, speed sensors, acceleration sensors, optical sensors, light sensors, imaging sensors, photon sensors, pressure sensors, force sensors, density sensors, load sensors, thermal sensors, heat sensors, cold sensors, other temperature sensors, proximity sensors, presence sensors, biometric sensors, and the like. The sensor devices 108 can utilize one or more existing sensor technologies, although the use of future sensor technologies that improve upon various aspects of sensor form factor, sensitivity, power consumption, performance characteristics, combinations thereof, and the like are also contemplated. Moreover, the sensor devices 108 can be manufactured using any manufacturing process or multiple processes, including, for example, nano-manufacturing and pico-manufacturing processes.

The sensor devices 108, in some embodiments, form at least a portion of a sensor network 112. The sensor network 112 can be a wired, wireless, or hybrid wired-wireless network. The sensor network 112 can include one or more gateway nodes that facilitate communication of the sensor data 110 to the user device 106. The sensor devices 108 included in the sensor network 112 can be connected in any network topology. For example, the sensor devices 108 included in the sensor network 112 might be arranged in a bus network, a ring network, a star network, a tree network, a mesh network, the like, or a hybrid thereof.

The user device 106 can be or can include one or more mobile telephones, smartphones, tablet computers, slate computers, smart watches, fitness devices, smart glasses (e.g., the GOOGLE GLASS family of products), other wearable devices, mobile media playback devices, laptop computers, notebook computers, netbook computers, computers of other form factors, computing devices of other form factors, other computing systems, other computing devices, and/or the like. It should be understood that the functionality of the user device 106 can be provided by a single device, by two or more similar devices, and/or by two or more dissimilar devices. For purposes of describing the concepts and technologies disclosed herein, the user device 106 is described herein as a smartphone. It should be understood that this embodiment is illustrative, and should not be construed as being limiting in any way.

The illustrated user device 106 includes one or more operating systems 114, one or more applications 116, one or more location components 118, one or more user preferences 120, an event detection module 122, and an information collection module 124. It should be understood, however, that the user device 106 can include other components. An illustrative example architecture of the user device 106 is described in greater detail herein with reference to FIG. 7.

The operating system(s) 114 can control the operation of the user device 106. In some embodiments, the operating system(s) 114 includes the event detection module 122 and/or the information collection module 124, both of which are described in greater detail below. The operating system(s) 114 can be executed by one or more processors (best shown in FIG. 7) to cause the user device 106 to perform various operations. The operating system 114 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The application(s) 116 can include, but are not limited to, fitness applications, productivity applications, entertainment applications, video applications, music applications, video game applications, camera applications, messaging applications, social network applications, enterprise applications, map applications, security applications, presence applications, visual voice mail applications, text-to-speech applications, speech-to-text applications, email applications, calendar applications, camera applications, web browser applications, combinations thereof, and the like. The application(s) 116 can execute on top of the operating system(s) 114. The application(s) 116 can be executed by one or more processors (best shown in FIG. 7) to cause the user device 106 to perform various operations. The application(s) 116 can utilize at least a portion of the sensor data 110 to perform operations to provide, at least in part, one or more services to the user 104. These applications are merely illustrative of some contemplated applications that may be used in accordance with various embodiments of the concepts and technologies described herein and therefore should not be construed as being limiting in any way.

The location component(s) 118 can include hardware, software, and/or firmware to enable one or more location determining techniques to determine the location of the user device 106. For example, the location component(s) 118 can include one or more global positioning system ("GPS") devices, one or more assisted GPS ("A-GPS") devices, one or more indoor location devices, one or more WI-FI radios, one or more BLUETOOTH radios, one or more BLUETOOTH LOW ENERGY radios, one or more cellular radios, combinations thereof, and the like. The location component(s) 118 also can include software and/or firmware that controls operations of one or more of the aforementioned components to determine the location of the user device 106 via triangulation and/or other location determining techniques.

The user preference(s) 120 can include one or more preferences associated with one or more functions provided by the user device 106 or any specific component(s) thereof. The user preference(s) 120 can include one or more location preferences that define one or more locations (e.g., the area 102) in which the user device 106 should enable communications with one or more available sensors (e.g., the sensor devices 108 in the area 102) so that the user device 106 can receive sensor data (e.g., the sensor data 110) for use in providing, by the application(s) 116, one or more services to the user 104. The user preference(s) 120 can include one or more sensor preferences that define one or more sensors (e.g., one or more of the sensor devices 108) with which the user device 106 should communicate. The sensor preferences can additionally or alternatively define one or more sensor types with which the user device 106 should communicate. The sensor preferences can additionally or alternatively define one or more preferences for one or more sensor settings. The user preference(s) 120 can include one or more preferences associated with a medical diagnosis or other medical information associated with the user 104. The user preference(s) 120 can include one or more preferences associated with security of the user 104, security of the user device 106, security of other individuals associated with the user 104, security of one or more vehicles associated with the user 104, and/or security of one or more homes, places of business, or any other location (e.g., the area 102). The user preference(s) 120 can include any other preferences that are user-defined or pre-defined and selectable by the user 104. The user preference(s) 120 can include preferences associated with a diet of the user 104 (e.g., likes, dislikes, and/or allergy information) and/or any physical handicaps of the user 104 (e.g., a hearing disorder).

In some embodiments, the user preference(s) 120 can be pre-defined and can be enabled or disabled by the user 104 via a user interface of the operating system(s) 114 and/or the application(s) 116. In some embodiments, the user preference(s) 120 can be defined via a user interface designed, at least in part, to enable users to define one or more user preferences such as through the use of one or more IF-THEN statements, rules, and/or the like.

The event detection module 122 can include computer-executable instructions that, when executed by one or more processors (best shown in FIG. 7), cause the user device 106 to perform various operations regarding event detection. More particularly, the event detection module 122 can detect the occurrence of one or more events. An "event" as used herein can be or can include an input by the user 104, a change in one or more environmental conditions (e.g., temperature, sound, pressure, and/or the like) of the area 102 as measured by one or more of the sensor devices 108 and reported to the user device 106, a change in one or more physical conditions (e.g., heart rate, blood pressure, temperature, oxygen level, other biometrics, and/or the like) of the user 104, a change in one or more device conditions (e.g., battery level, location, launched application(s), signal strength, network connectivity, and/or the like) of the user device 106, and/or the detection that one or more thresholds for one or more pre-defined conditions have been met or exceeded.

In response to an event, the user device 106 can collect, via the information collection module 124, information 126 and can send the information 126 to a profile orchestration system 128 via a network 130. In the illustrated embodiment, the information 126 includes a location, an application ("app") service, a user preference, and a device capability. The information 126 can include multiple locations, multiple app services, multiple user preferences, and/or multiple device capabilities. The information 126 can additionally or alternatively include other information that can be utilized by the profile orchestration system 128 to orchestrate the creation, modification, or deletion of one or more device operational profiles 129A-129N (hereinafter collectively referred to as "device operational profiles 129"). The information 126 is merely illustrative of some contemplated information that can be collected by the information collection module 124 for the user device 106 in accordance with various embodiments of the concepts and technologies described herein and therefore should not be construed as being limiting in any way.

A device operational profile, such as one of the device operational profiles 129, provides a quantitative characterization of how one or more of the sensor devices 108 and/or the user device 106 should perform to provide, at least in part, one or more services to the user 104. A device operational profile may define one or more operations to be performed by a device, a total time the operation(s) should be performed, a frequency with which the operation(s) should be performed, and/or any other instructions regarding how the device should perform to provide, at least in part, one or more services to the user 104. A device operational profile, in some embodiments, can include an identifier associated with the user 104, one or more user preferences, an identifier associated with one or more devices associated with the profile, and the like.

A location included in the information 126 can include a location of the user device 106 as determined by the location component(s) 118. An app service included in the information 126 can include a service to be provided by one or more of the applications 116. A user preference can include one of the user preferences 120. A device capability can include one or more capabilities of the user device 106.

The information 126 can be used by the profile orchestration system 128 to determine if one or more of the device operational profiles 129 exist in a device operational profile database 132 that are suitable for one or more sensor devices (e.g., the sensor devices 108) operating within a location (e.g., the area 102) to provide, at least in part, a service to the user 104. If one or more suitable device operational profiles exist in the device operational profile database 132, then the profile orchestration system 128 can send the suitable device operational profile(s) to a device operational profile provisioning system 134, which can generate one or more settings and deliver the setting(s) to one or more of the sensor devices 108. If one or more of suitable device operational profiles do not exist, then the profile orchestration system 128 can create a new device operational profile based, at least in part, upon the information 126, and can send the new device operational profile to the device operational profile database 132 for storage and also to the device operational profile provisioning system 134, which can generate one or more settings and deliver the setting(s) to one or more of the sensor devices 108. The profile orchestration system 128 can modify one or more existing device operational profiles to accommodate the location, the app service, the user preference, the device capability, other information included in the information 126, or any combination thereof.

The network 130, in some embodiments, can be or can include one or more wireless personal area networks ("WPANs"), one or more wireless local area networks ("WLANs"), one or more wireless wide area networks ("WWANS"), one or more wireless metropolitan area networks ("WMANs"), one or more campus area networks ("CANs"), and/or one or more packet data networks, such as the internet or a portion thereof.

The network 130 may use any wireless communications technology or combination of wireless communications technologies, some examples of which include, but are not limited to, BLUETOOTH, ZIGBEE, WI-FI, WI-FI peer-to-peer, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like.

The network 130 embodied, at least in part, as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

The illustrated profile provisioning system 134 is provided via an elastic cloud computing environment. It should be understood, however, that the profile provisioning system 134 can be implemented on one or more computing systems that are not configured in an elastic cloud computing environment. The illustrated profile provisioning system 134 includes a hardware resource layer 136, a virtualization/control layer 138, and a virtual resource layer 140. The hardware resource layer 136 provides hardware resources, which, in the illustrated embodiment, include one or more compute resources 142, one or more memory resources 144, and one or more other resources 146. The compute resource(s) 142 can include one or more hardware components that perform computations to process data, and/or to execute computer-executable instructions of one or more application programs, operating systems, and/or other software. The compute resource(s) 142 can include one or more central processing units ("CPUs") configured with one or more processing cores. The compute resource(s) 142 can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resource(s) 142 can include one or more discrete GPUs. In some other embodiments, the compute resource(s) 142 can include CPU and GPU components that are configured in accordance with a co-processing CPU/GPU computing model, wherein the sequential part of an application executes on the CPU and the computationally-intensive part is accelerated by the GPU. The compute resource(s) 142 can include one or more system-on-chip ("SoC") components along with one or more other components, including, for example, one or more of the memory resources 144, and/or one or more of the other resources 146. In some embodiments, the compute resource(s) 142 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resource(s) 142 can be or can include one or more hardware components architected in accordance with an ARM architecture, available for license from ARM HOLDINGS of Cambridge, United Kingdom. Alternatively, the compute resource(s) 142 can be or can include one or more hardware components architected in accordance with an x86 architecture, such an architecture available from INTEL CORPORATION of Mountain View, Calif., and others. Those skilled in the art will appreciate the implementation of the compute resource(s) 142 can utilize various computation architectures, and as such, the compute resource(s) 142 should not be construed as being limited to any particular computation architecture or combination of computation architectures, including those explicitly disclosed herein.

The memory resource(s) 144 can include one or more hardware components that perform storage operations, including temporary or permanent storage operations. In some embodiments, the memory resource(s) 144 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 142.

The other resource(s) 146 can include any other hardware resources that can be utilized by the compute resources(s) 142 and/or the memory resource(s) 144 to perform operations described herein. The other resource(s) 146 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 136 can be virtualized by one or more virtual machine monitors ("VMMs") 148 (also known as "hypervisors") operating within the virtualization/control layer 138 to create one or more virtual resources that reside in the virtual resource layer 140. The VMMs 148 can be or can include software, firmware, and/or hardware that alone or in combination with other software, firmware, and/or hardware, creates one or more virtual resources operating within the virtual resource layer 140.

The virtual resources operating within the virtual resource layer 140 can include abstractions of at least a portion of the compute resources 142, the memory resources 144, and/or the other resources 146, or any combination thereof. In the illustrated embodiment, the virtual resource layer 140 includes one or more virtual machines ("VMs") 150A-150N (hereinafter collectively referred to as "VMs 150"). The VMs 150 can generate one or more settings in accordance with the device operational profile(s) received from the profile orchestration system 128 and can provision the sensor devices 108 with the settings so that the sensor devices 108 can perform one or more operations to provide, at least in part, one or more services for the user 104. In the illustrated example, the VMs 150 can generate a device operational profile settings 152A-152N and can deliver the device operational profile settings 152A-152N to the sensor devices 108A-108N, respectively, and in this manner, can provision the sensor devices 108A-108N for performing one or more operations to provide, at least in part, one or more services for the user 104. The device operational profile settings 152A-152N can generally include any settings that are useable by the sensor devices 108A-108N, respectively, to instruct the sensor devices 108A-108N to perform, at least in part, one or more operations to provide, at least in part, one or more services for the user 104.

Figure 2:
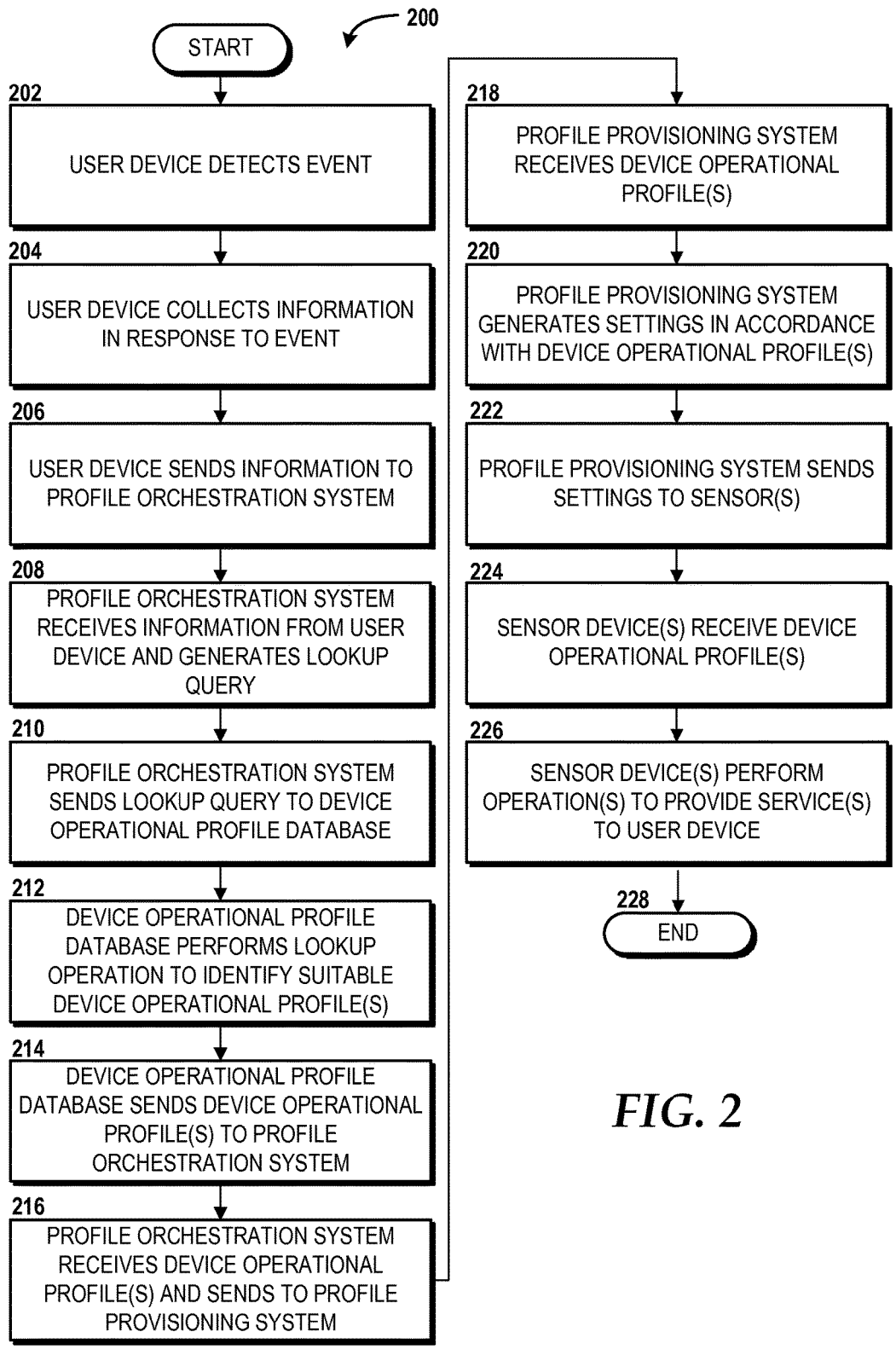
FIG. 2 is a flow diagram illustrating aspects of a method for distributing a device operational profile to a sensor device in response to an event, according to an illustrative embodiment.

Turning now to FIG. 2, aspects of a method 200 for distributing a device operational profile to a sensor device in response to an event will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device such as the user device 106, one or more of the sensor devices 108, the profile orchestration system 128, the profile provisioning system 134, and/or other devices and/or systems described herein to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 106, one or more of the sensor devices 108, the profile orchestration system 128, the profile provisioning system 134, or a combination thereof, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user device 106 detects, via the event detection module 122, an event. From operation 202, the method 200 proceeds to operation 204, where the user device 106 collects, via the information collection module 124, information (e.g., the information 126) in response to the event. From operation 204, the method 200 proceeds to operation 206, where the user device 106 sends, via the network 130, the information to the profile orchestration system 128.

From operation 206, the method 200 proceeds to operation 208, where the profile orchestration system 128 receives the information from the user device 106 and generates a lookup query directed to the device operational profile database 132. The lookup query can include at least a portion of the information and can be used by the profile orchestration system 128 to determine whether one or more suitable device operational profiles exist for the information. From operation 208, the method 200 proceeds to operation 210, where the profile orchestration system 128 sends the lookup query to the device operational profile database 132.

From operation 210, the method 200 proceeds to operation 212, where the device operational profile database 132 receives the lookup query and performs a lookup operation in response and identifies one or more device operational profiles that are suitable for the information. From operation 212, the method 200 proceeds to operation 214, where the device operational profile database 132 sends the device operational profile(s) to the profile orchestration system 128. From operation 214, the method 200 proceeds to operation 216, where the profile orchestration system 128 receives the device operational profile(s) and sends the device operational profile(s) to the profile provisioning system 134.

From operation 216, the method 200 proceeds to operation 218, where the profile provisioning system 134 receives the device operational profile(s) from the profile orchestration system 128. From operation 218, the method 200 proceeds to operation 220, where the profile provisioning system 134 generates one or more settings (e.g., the device operational profile settings 152A-152N) in accordance with the device operational profile(s). From operation 220, the method 200 proceeds to operation 222, where the profile provisioning system 134 sends the device operational profile settings 152A-152N to the sensor devices 108A-108N, respectively, and in this manner, provisions the sensor devices 108A-108N to perform one or more operations to provide, at least in part, one or more services for the user 104, such as the app service indicated in the information 126.

From operation 222, the method 200 proceeds to operation 224, where the sensor devices 108A-108N receive the device operational profile settings 152A-152N from the profile provisioning system 134. From operation 224, the method 200 proceeds to operation 226, where the sensor devices 108A-108N perform one or more operations to provide, at least in part, one or more services, to the user device 106 in accordance with the device operational profile settings 152A-152N. From operation 226, the method 200 proceeds to operation 228. The method 200 can end at operation 228.

Figure 3:
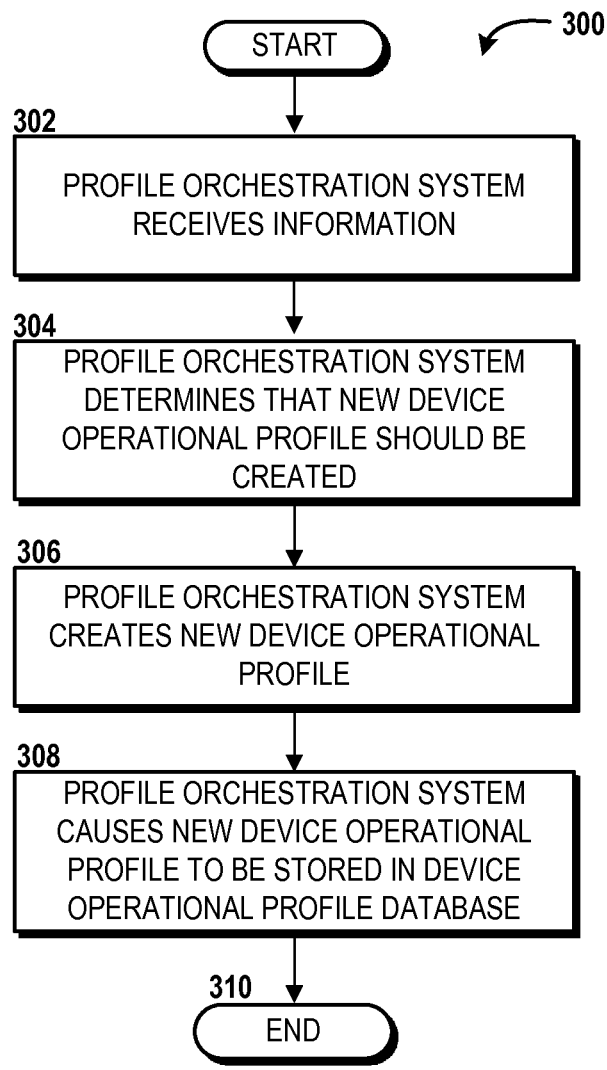
FIG. 3 is a flow diagram illustrating aspects of a method for creating a new device operational profile, according to an illustrative embodiment.

Turning now to FIG. 3, aspects of a method 300 for creating a new device operational profile will be described in detail, according to an illustrative embodiment. The method 300 will be described with reference to FIG. 3 and further reference to FIG. 1. The method 300 begins at operation 302, where the profile orchestration system 128 receives information (e.g., the information 126) from the user device 106. From operation 302, the method 300 proceeds to operation 304, where the profile orchestration system 128 determines that a new device operational profile should be created. In some embodiments, the profile orchestration system 128 can determine that new device operational profile should be created in response to the device operational profile database 132 being unable to return at least one suitable device operational profile for the information.

From operation 304, the method 300 proceeds to operation 306, where the profile orchestration system 128 creates a new device operational profile. From operation 306, the method 300 proceeds to operation 308, where the profile orchestration system 128 causes the new device operational profile to be stored in the device operational profile database 132. From operation 308, the method 300 proceeds to operation 310. The method 300 ends at operation 310.

Figure 4:
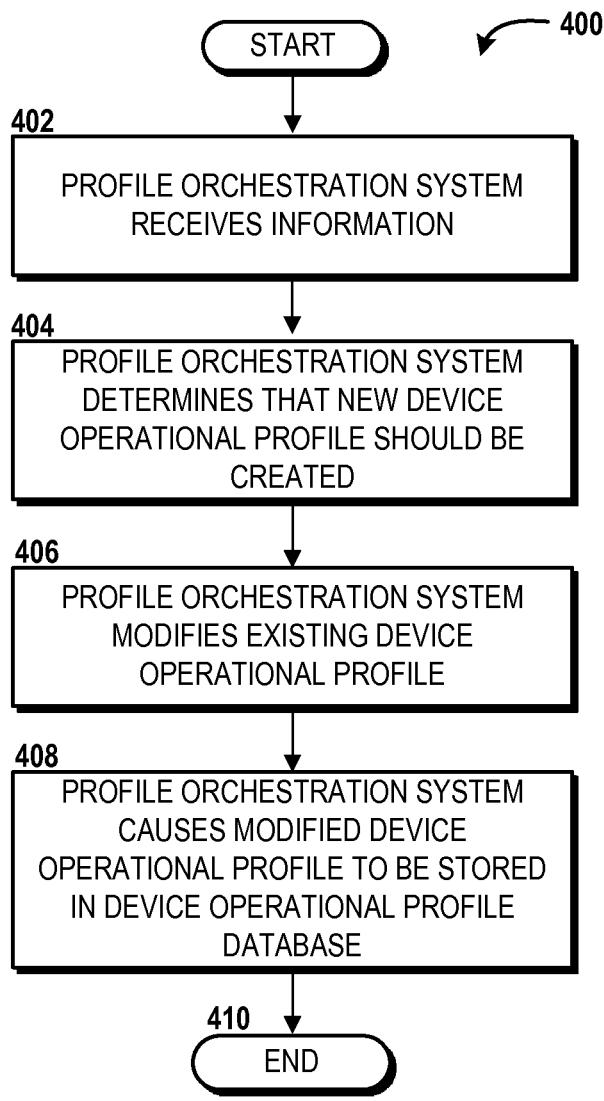
FIG. 4 is a flow diagram illustrating aspects of a method for modifying a device operational profile, according to an illustrative embodiment.

Turning now to FIG. 4, aspects of a method 400 for modifying a device operational profile will be described in detail, according to an illustrative embodiment. The method 400 will be described with reference to FIG. 4 and further reference to FIG. 1. The method 400 begins at operation 402, where the profile orchestration system 128 receives information (e.g., the information 126) from the user device 106. From operation 402, the method 400 proceeds to operation 404, where the profile orchestration system 128 determines that an existing device operational profile should be modified. In some embodiments, the profile orchestration system 128 can determine that an existing device operational profile should be modified based upon one or more changes to conditions of the area 102. In some embodiments, the profile orchestration system 128 can determine that an existing device operational profile should be modified based upon an "end-of-life" instruction associated with the existing device operational profile. For example, a device operational profile may no longer be used by the sensor devices 108 due to changes in the hardware, software, and/or firmware of the sensor devices 108 that cause the existing device operational profile to be no longer useful. In some embodiments, the profile orchestration system 128 can determine that an existing device operational profile should be modified during the creation of a new device operational profile. In these embodiments, the existing device operational profile can be used as a template during creation of the new device operational profile.

From operation 404, the method 400 proceeds to operation 406, where the profile orchestration system 128 modifies the existing device operational profile. From operation 406, the method 400 proceeds to operation 408, where the profile orchestration system 128 causes the modified device operational profile to be stored in the device operational profile database 132. From operation 408, the method 400 proceeds to operation 410. The method 400 ends at operation 410.

Figure 5:
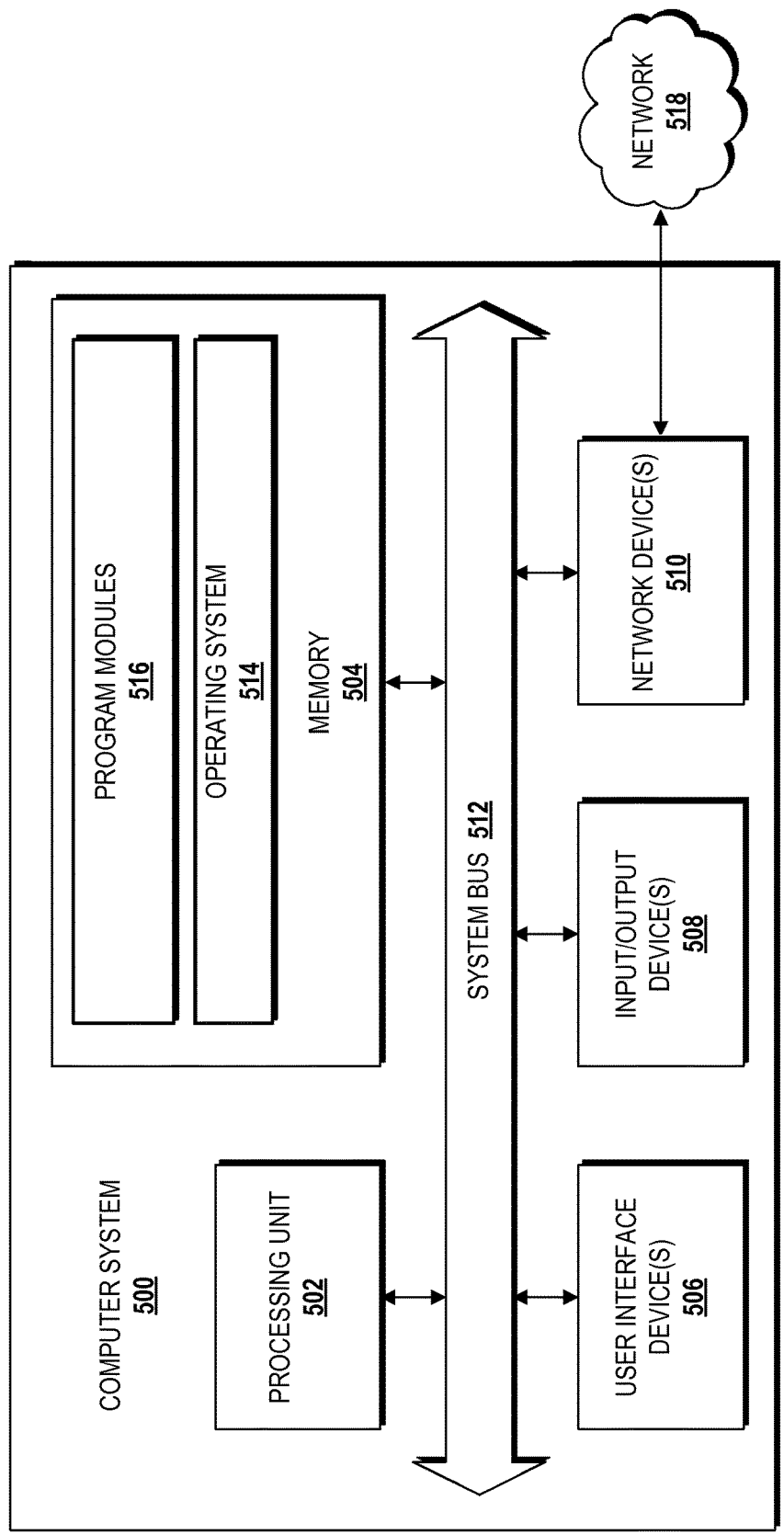
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the user device 106, the profile orchestration system 128, the profile provisioning system 134, and/or resources in the hardware resource layer 136 can utilize an architecture that is the same as or similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 (e.g., the operating system(s) 114) and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 can include the application(s) 116, the event detection module 122, and/or the information collection module 124 in embodiments that the user device 106 is configured like the computer system 500. The program modules 516 and/or other programs can be embodied in computer-readable media containing instructions that, when executed by the processing unit 502, perform the methods 200-400 or at least a portion thereof, described in detail above with respect to FIGS. 2-4. According to embodiments, the program modules 516 may be embodied in hardware, software, firmware, or any combination thereof. Although not shown in FIG. 5, it should be understood that the memory 504, in embodiments that the user device 106 is configured like the computer system 500, also can be configured to store the sensor data 110, the user preference(s) 120, the information 126, and/or other data.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 518, which can include, for example, the sensor network 112 and/or the network 130. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 518 may be a wired network such as, but not limited to, a wide area network ("WAN"), a wired LAN such as provided via Ethernet, a wired personal area network n ("PAN"), or a wired metropolitan area network ("MAN").

Figure 6:
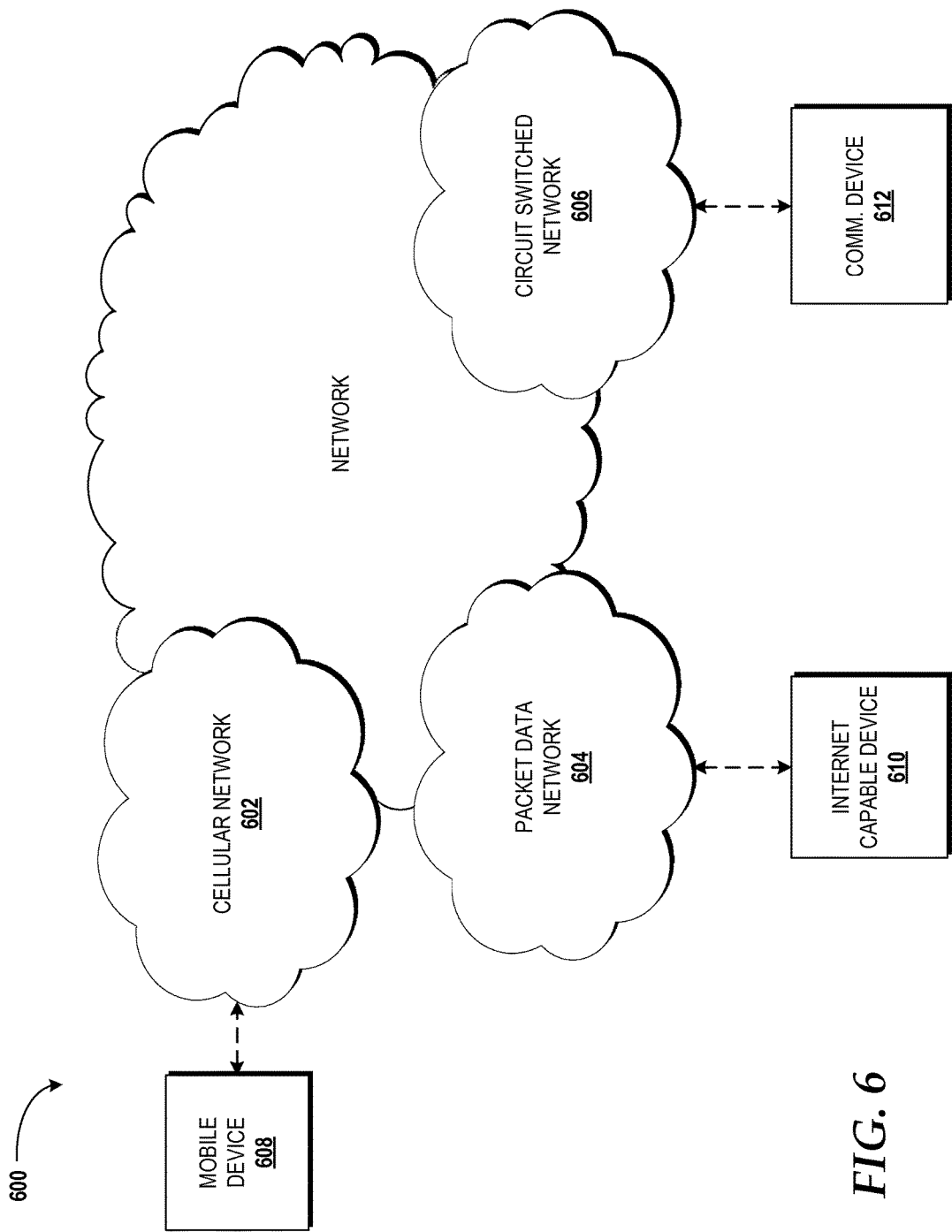
FIG. 6 schematically illustrates a network, according to an illustrative embodiment.

Turning now to FIG. 6, additional details of a network 600 are illustrated, according to an illustrative embodiment. The network 600 can be or can include the network 130. The illustrated network 600 includes a cellular network 602, a packet data network 604, for example, the Internet, and a circuit switched network 606, for example, a publicly switched telephone network ("PSTN"). The cellular network 602 includes various components such as, but not limited to, BTSs, NodeBs or eNodeBs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, the user device 106, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. In some embodiments, the packet data network 604 includes the profile orchestration system 128, the device operational profile database 132, and/or the profile provisioning system 134. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the user device 106, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, the user device 106, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Figure 7:
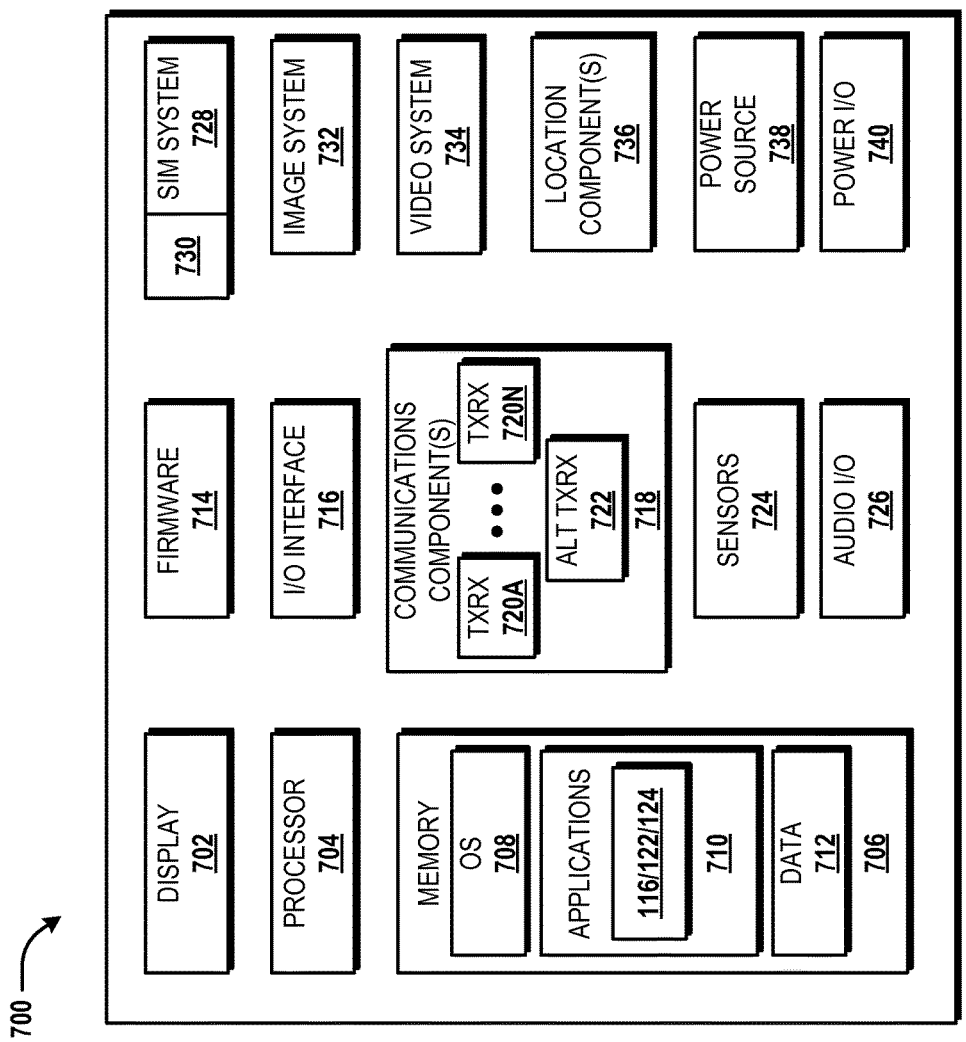
FIG. 7 is a block diagram illustrating an example mobile device capable of implementing aspects of the embodiments disclosed herein.

Turning now to FIG. 7, an illustrative mobile device 700 and components thereof will be described. In some embodiments, the user device 106 described above with reference to FIG. 1 can be configured as and/or can have an architecture similar or identical to the mobile device 700 described herein in FIG. 7. It should be understood, however, that the user device 106 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708 (e.g., the operating system(s) 114), one or more applications 710 (e.g., the application(s) 116, the event detection module 122, and the information collection module 124), other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the sensor data 110, the user preference(s) 120, the information 126, and/or other data, if desired.

According to various embodiments, the applications 710 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks described above herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMA, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, the sensor devices 108, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 700 also can include one or more location components 736 (e.g., the location component(s) 118). The location components 736 can be configured to send and/or receive signals to determine a geographic location of the mobile device 700. According to various embodiments, the location components 736 can send and/or receive signals from GPS devices, A-GPS devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that concepts and technologies directed to device operational profiles have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
receiving, by a profile orchestration system comprising a processor, information from a user device, wherein the information identifies a location of the user device and further identifies a service to be provided by the user device to a user of the user device;
determining, by the profile orchestration system, based on the information received from the user device, whether one of a plurality of existing device operational profiles stored in a device operational profile database is suitable for a sensor device located within an area associated with the location of the user device;
in response to determining that an existing device operational profile of the plurality of existing device operational profiles suitable for the sensor device located within the area associated with the location of the user device does not exist, generating, by the profile orchestration system, based on the information received from the user device, a device operational profile comprising characterizations of how the sensor device located within the area associated with the location of the user device is to perform in order to collect sensor data and to provide the sensor data to the user device for use by an application executed by the user device to provide the service to the user of the user device; and
sending, by the profile orchestration system, the device operational profile to a profile provisioning system that uses the device operational profile to generate a setting to provision the sensor device located within the area associated with the location of the user device so that the sensor device performs in accordance with the characterizations of the device operational profile to collect the sensor data and to provide, via a sensor network, the sensor data to the user device for use by the application executed by the user device to provide the service to the user of the user device.

2. The method of claim 1, wherein the information further identifies the application executed by the user device.

3. The method of claim 1, wherein the information further identifies a user preference.

4. The method of claim 1, wherein the information further identifies a capability of the user device.

5. The method of claim 1, wherein determining, by the profile orchestration system, based on the information received from the user device, whether one of the plurality of existing device operational profiles stored in the device operational profile database is suitable for the sensor device located within the area associated with the location of the user device comprises:
   generating a lookup query comprising the information; and
   sending the lookup query to the device operational profile database.

6. The method of claim 1, further comprising determining, by the profile orchestration system, based on the information received from the user device, whether an existing device operational profile can be modified to be suitable for the sensor device within the area associated with the location of the user device, wherein the device operational profile is generated by the profile orchestration system further in response to determining that an existing device operational profile cannot be modified to be suitable for the sensor device located within the area associated with the location of the user device.

7. A profile orchestration system comprising:
   a processor; and
   a memory that stores computer-readable instructions that, when executed by the processor, causes the processor to perform operations comprising:
      receiving information from a user device, wherein the information identifies a location of the user device and further identifies a service to be provided by the user device to a user of the user device,
      determining, based on the information received from the user device, whether one of a plurality of existing device operational profiles stored in a device operational profile database is suitable for a sensor device located within an area associated with the location of the user device,
      in response to determining that an existing device operational profile of the plurality of existing device operational profiles suitable for the sensor device located within the area associated with the location of the user device does not exist, generating, based on the information received from the user device, a device operational profile comprising characterizations of how the sensor device located within the area associated with the location of the user device is to perform in order to collect sensor data and to provide the sensor data to the user device for use by an application executed by the user device to provide the service to the user of the user device, and
      sending the device operational profile to a profile provisioning system that uses the device operational profile to generate a setting to provision the sensor device located within the area associated with the location of the user device so that the sensor device performs in accordance with the characterizations of the device operational profile to collect the sensor data and to provide, via a sensor network, the sensor data to the user device for use by the application executed by the user device to provide the service to the user of the user device.

8. The profile orchestration system of claim 7, wherein the information further identifies at least one of:
   the application executed by the user device;
   a user preference; or
   a capability of the user device.

9. The profile orchestration system of claim 7, wherein the sensor device is one of a plurality of sensor devices that form the sensor network.

10. The profile orchestration system of claim 7, wherein determining, based on the information received from the user device, whether one of the plurality of existing device operational profiles stored in the device operational profile database is suitable for the sensor device within the area associated with the location of the user device comprises:
   generating a lookup query comprising the information; and
   sending the lookup query to the device operational profile database.

11. The profile orchestration system of claim 7, wherein the operations further comprise determining, based on the information received from the user device, whether an existing device operational profile can be modified to be suitable for the sensor device located within the area associated with the location of the user device, wherein the device operational profile is generated by the profile orchestration system in response to determining that an existing device operational profile cannot be modified to be suitable for the sensor device located within the area associated with the location of the user device.

12. A computer-readable storage medium having instructions stored thereon that, when executed by a processor of a profile orchestration system, cause the profile orchestration system to perform operations comprising:
   receiving information from a user device, wherein the information identifies a location of the user device and further identifies a service to be provided by the user device to a user of the user device;
   determining, based on the information received from the user device, whether one of a plurality of existing device operational profiles stored in a device operational profile database is suitable for a sensor device located within an area associated with the location of the user device;
   in response to determining that an existing device operational profile of the plurality of existing device operational profiles suitable for the sensor device located within the area associated with the location of the user device does not exist, generating, based on the information received from the user device, a device operational profile comprising characterizations of how the sensor device located within the area associated with the location of the user device is to perform in order to collect sensor data and to provide the sensor data to the user device for use by an application executed by the user device to provide the service to the user of the user device; and
   sending the device operational profile to a profile provisioning system that uses the device operational profile to generate a setting to provision the sensor device located within the area associated with the location of the user device so that the sensor device performs in accordance with the characterizations of the device operational profile to collect the sensor data and to provide, via a sensor network, the sensor data to the user device for use by the application executed by the user device to provide the service to the user of the user device.

13. The computer-readable storage medium of claim 12, wherein the information further identifies at least one of:
   the application executed by the user device;
   a user preference; or
   a capability of the user device.

14. The computer-readable storage medium of claim 12, wherein determining, based on the information received from the user device, whether one of the plurality of existing device operational profiles stored in the device operational profile database is suitable for generating the setting to provision the sensor device located within the area associated with the location of the user device comprises:

generating a lookup query comprising the information; and sending the lookup query to the device operational profile database.

15. The computer-readable storage medium of claim 12, wherein the operations further comprise determining, based on the information received from the user device, whether an existing device operational profile can be modified to be suitable for the sensor device located within the area associated with the location of the user device, wherein the device operational profile is generated by the profile orchestration system in response to determining that an existing device operational profile cannot be modified to be suitable for the sensor device located within the area associated with the location of the user device.

16. The method of claim 1, wherein the characterizations comprise at least one of an operation to be performed by the sensor device, an amount of time the operation is to be performed, or a frequency with which the operation is to be performed.

17. The profile orchestration system of claim 7, wherein the characterizations comprise at least one of an operation to be performed by the sensor device, an amount of time the operation is to be performed, or a frequency with which the operation is to be performed.

18. The computer-readable storage medium of claim 12, wherein the characterizations comprise at least one of an operation to be performed by the sensor device, an amount of time the operation is to be performed, or a frequency with which the operation is to be performed.

* * * * *